United States Patent
Xu

(10) Patent No.: US 9,369,049 B2
(45) Date of Patent: Jun. 14, 2016

(54) INTEGRATED SWITCH MODE POWER SUPPLY CONTROLLER AND SWITCH MODE POWER SUPPLY USING THE SAME

(71) Applicant: Silergy Semiconductor Technology (Hangzhou) LTD, Hangzhou, ZheJiang Province (CN)

(72) Inventor: Xiaoru Xu, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 74 days.

(21) Appl. No.: 14/151,061

(22) Filed: Jan. 9, 2014

(65) Prior Publication Data

US 2014/0198540 A1 Jul. 17, 2014

(30) Foreign Application Priority Data

Jan. 17, 2013 (CN) .......................... 2013 1 0017681

(51) Int. Cl.
 *H02M 3/335* (2006.01)
 *H02M 1/00* (2006.01)

(52) U.S. Cl.
 CPC .. *H02M 3/33523* (2013.01); *H02M 2001/0054* (2013.01); *Y02B 70/1491* (2013.01)

(58) Field of Classification Search
 CPC ................. H02M 3/33523; H02M 2001/0054; H02M 3/335; H02M 3/22; H02M 3/33507; H02M 3/33546; H02M 2001/0058; H02M 2001/0048; H02M 2001/0038
 USPC .................................. 363/20–21.18; 323/283
 See application file for complete search history.

(56) References Cited

U.S. PATENT DOCUMENTS

| | | | |
|---|---|---|---|
| 8,531,853 B2 | 9/2013 | Baurle et al. | |
| 2010/0238689 A1* | 9/2010 | Fei et al. | 363/21.16 |
| 2011/0211376 A1* | 9/2011 | Hosotani | 363/97 |
| 2011/0267846 A1* | 11/2011 | Djenguerian | H02M 3/33523 363/21.12 |
| 2012/0025736 A1* | 2/2012 | Singh | H02M 3/156 315/307 |
| 2012/0049823 A1* | 3/2012 | Chen | 323/282 |
| 2012/0275199 A1* | 11/2012 | Li et al. | 363/21.15 |
| 2012/0327691 A1* | 12/2012 | Strijker | 363/21.01 |
| 2013/0003421 A1* | 1/2013 | Fang | H02M 3/33523 363/21.01 |
| 2013/0223108 A1 | 8/2013 | Xu | |
| 2013/0250629 A1 | 9/2013 | Xu | |
| 2014/0029313 A1* | 1/2014 | Telefus | 363/21.02 |
| 2014/0112030 A1* | 4/2014 | Fahlenkamp | 363/21.14 |

FOREIGN PATENT DOCUMENTS

| | | |
|---|---|---|
| CN | 201210216958.5 | 10/2012 |
| CN | 201210233135.3 | 10/2012 |

* cited by examiner

*Primary Examiner* — Timothy J Dole
*Assistant Examiner* — Shahzeb K Ahmad
(74) *Attorney, Agent, or Firm* — Michael C. Stephens, Jr.

(57) ABSTRACT

In one embodiment, an integrated switch mode power supply controller can include: a multiplexing pin that receives a detection voltage signal; a switch mode power supply that receives a DC input voltage, and operates in a switching cycle having first, second, and third time intervals; during the first time interval, the detection voltage signal is proportional to the DC input voltage, and a current compensation signal is generated according to the detection voltage signal to obtain a peak inductor current; during the second time interval, the detection voltage signal is proportional to an output voltage of the switch mode power supply, and a discharging duration of current through the inductor is determined based on the detection voltage signal; and during the third time interval, the detection voltage signal is proportional to a voltage across a power transistor of the switch mode power supply.

11 Claims, 4 Drawing Sheets

US 9,369,049 B2

INTEGRATED SWITCH MODE POWER SUPPLY CONTROLLER AND SWITCH MODE POWER SUPPLY USING THE SAME

RELATED APPLICATIONS

This application claims the benefit of Chinese Patent Application No. 201310017681.8, filed on Jan. 17, 2013, which is incorporated herein by reference in its entirety.

FIELD OF THE INVENTION

The present invention relates to power supplies, and more particularly to an integrated switch mode power supply controller, and an associated switch mode power supply.

BACKGROUND

Switch mode power supplies can efficiently convert electrical power from a source to a load, or to several different loads, with each corresponding to a different output. The main transistor of a switching-mode supply can switch between on and off states at a given operating frequency, and voltage regulation can be achieved by varying the ratio of the on-to-off time of the main transistor. Switch mode power supplies may have relatively high power conversion efficiency, as compared to other types of power converters. Switch mode power supplies may also be substantially smaller and lighter than a linear supply due to the smaller transformer size and weight.

SUMMARY

In one embodiment, an integrated switch mode power supply controller can include: (i) a multiplexing pin configured to receive a detection voltage signal; (ii) a switch mode power supply configured to receive a DC input voltage, and to operate in a switching cycle having first, second, and third time intervals; (iii) where during the first time interval, the detection voltage signal is proportional to the DC input voltage, and a current compensation signal is configured to be generated according to the detection voltage signal to obtain a peak current flowing through an inductor in the switch mode power supply; (iv) where during the second time interval, the detection voltage signal is proportional to an output voltage of the switch mode power supply, and a discharging duration of current through the inductor is determined based on the detection voltage signal; and (v) where during the third time interval, the detection voltage signal is proportional to a voltage across a power transistor of the switch mode power supply, the power transistor being turned on at a local minimum according to the detection voltage signal.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Integrated circuits or "chips" are widely used in various electronic devices or modules, and such chips are becoming increasingly miniaturized and portable. As a result, increased performance and size requirements (e.g., relatively high density and levels of integration, along with relatively small size) come into play in many applications. In one application, a number of controller chips and an integrated driving circuit can be realized by utilising a relatively small number of peripheral circuits.

Figure 1:
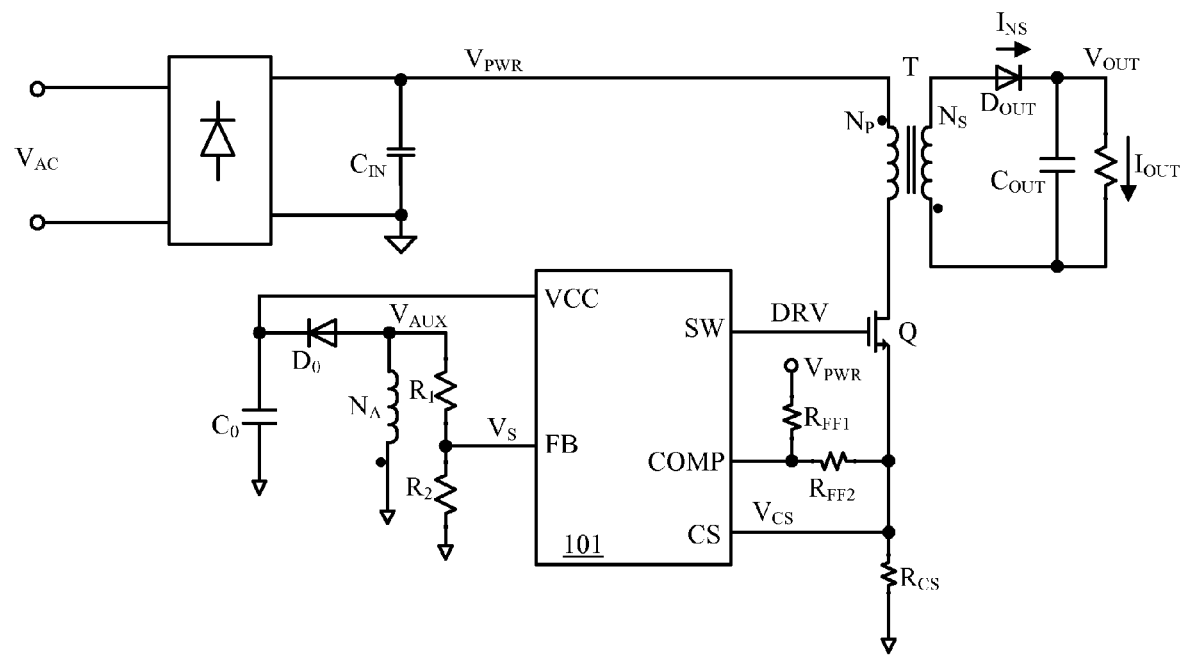
FIG. 1 is a schematic block diagram of a first example switch mode power supply.

Referring now to FIG. 1, shown is a schematic block diagram of an example switch mode power supply. In this particular case, the switch mode power supply is realized by an isolated flyback converter with an output current regulating circuit. The main structure or power stage circuit of the switch mode power supply can thus utilize a flyback topology, and may include transformer T, power transistor Q, output diode $D_{OUT}$, and output capacitor $C_{OUT}$. Controller chip 101 can utilize a peak current control method, and may control the periodic turning-on and turning-off of power switch (e.g., transistor) Q to maintain output current $I_{OUT}$ as substantially constant.

Detection resistor $R_{CS}$ can connect between power switch Q and ground to sample current flowing through primary side winding $N_P$ of transformer T. Sample signal $I_{CS}$ can be provided at pin CS of controller chip 101 via voltage $V_{CS}$. Auxiliary winding $N_A$ can be coupled to transformer T, and may be used to sample current information of secondary side winding $N_S$. Voltage signal $V_{AUX}$ can be used to obtain detection voltage $V_S$ via a divider resistor network formed by resistors $R_1$ and $R_2$. Detection voltage signal $V_S$ can be provided to controller chip 101 by way of pin FB. In addition, voltage signal $V_{AUX}$ can be filtered by diode $D_0$ and capacitor $C_0$, and a voltage can be generated to supply power to controller chip 101 via pin VCC.

Due to signal transfer delay of controller chip 101, as well as circuit delays due to control logic and driving, the peak current of primary side winding $N_P$ and the peak current obtained by detection voltage $V_{CS}$ on detection resistor $R_{CS}$ can be different. Thus, the peak value as indicated by detection voltage $V_{CS}$ may not match the actual peak current of primary side winding N. For example, the timing of the actual peak event of primary side winding $N_P$ may be different than that represented by detection voltage $V_{CS}$. Inaccurate peak current can result in various adverse control effects, and may influence the adjustment accuracy of output current $I_{OUT}$. Therefore, this example switch mode power supply can also include compensation circuitry to compensate for the peak current. Specifically, resistors $R_{FF1}$ and $R_{FF2}$ can connect to DC input voltage $V_{PWR}$, power switch device Q, and detection resistor $R_{CS}$, in order to compensate for detection voltage $V_c$. The voltage on the common node of resistors $R_{FF1}$ and $R_{FF2}$ can be utilized as a compensated correct peak current signal, and may be provided to controller chip 101 via pin COMP.

Controller chip 101 can utilise current information and reference voltage $V_{REF}$ that indicates a desired output current/voltage to provide driving signal DRV through pin SW. For example, the switch state of power switch Q can be controlled such that output current $I_{OUT}$ can be at or above a predetermined (e.g., reference) level, even when influenced by various factors (e.g., load conditions, etc.). However, drawbacks of this approach include the number of pins, including compensation pin COMP, and a relatively complex control solution, which can work against chip minimization goals, and may increase production costs.

In one embodiment, an integrated switch mode power supply controller can include: (i) a multiplexing pin configured to receive a detection voltage signal; (ii) a switch mode power supply configured to receive a DC input voltage, and to operate in a switching cycle having first, second, and third time intervals; (iii) where during the first time interval, the detection voltage signal is proportional to the DC input voltage, and a current compensation signal is configured to be generated according to the detection voltage signal to obtain a peak current flowing through an inductor in the switch mode power supply; (iv) where during the second time interval, the detection voltage signal is proportional to an output voltage of the switch mode power supply, and a discharging duration of current through the inductor is determined based on the detection voltage signal; and (v) where during the third time interval, the detection voltage signal is proportional to a voltage across a power transistor of the switch mode power supply, the power transistor being turned on at a local minimum according to the detection voltage signal.

Figure 2A:
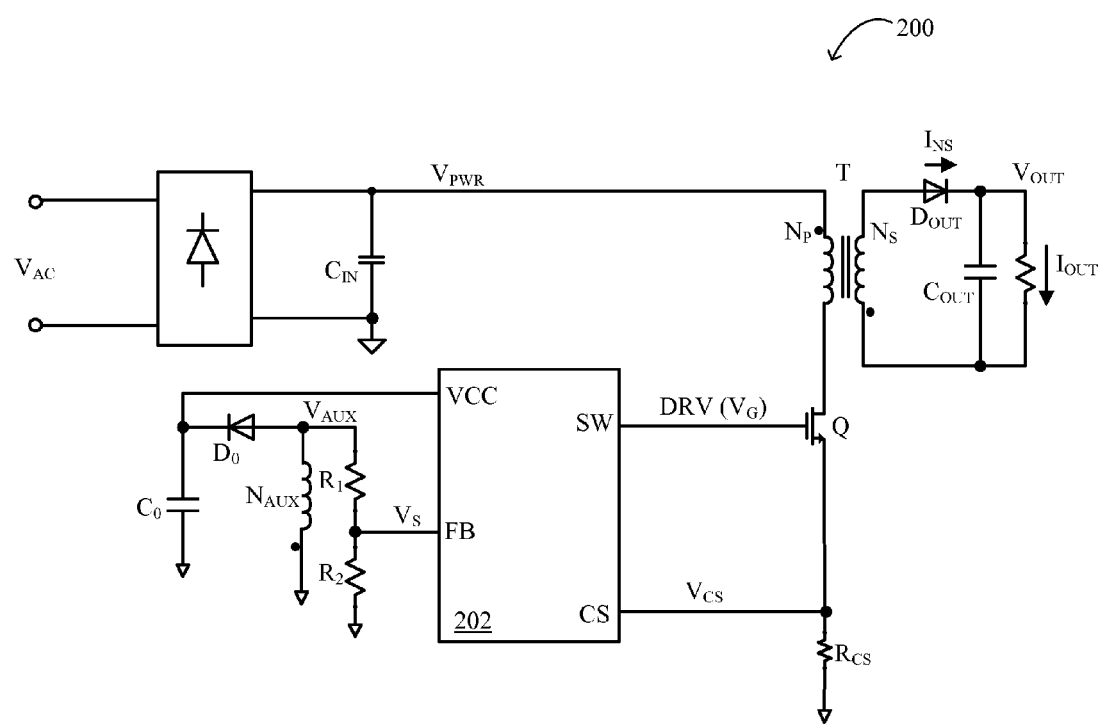
FIG. 2A is a schematic block diagram of an example switch mode power supply in accordance with embodiments of the present invention.

Referring now to FIG. 2A, shown is a schematic block diagram of an example switch mode power supply with a controller, in accordance with embodiments of the present invention. In this particular example, switch mode power supply 200 can include a power stage circuit and integrated switch power controller 202. For example, integrated switch power controller 202 may be a chip or a circuit module, and may be integrated with one or more other elements of switch mode power supply 200, such as on a same chip or on a printed-circuit board (PCB). In this case, the power stage circuit can employ a flyback topology. A flyback converter can be used in AC/DC or DC/DC conversion with galvanic isolation between the input and any outputs. The flyback converter is typically a boost converter with the inductor split to form a transformer (e.g., T) such that the voltage ratios are multiplied with an additional advantage of isolation. While a flyback topology is shown in this particular example, any other suitable power stage circuit topologies (e.g., buck, buck-boost, Sepic, etc.) can be employed in certain embodiments.

Integrated switch power controller 202 can include multiplexing pin FB. A "pin" can provide an external connection to the integrated circuit, module, circuit portion, or chip that forms integrated switch power controller 202. Multiplexing pin FB can receive detection voltage signal $V_S$ generated by auxiliary winding $N_A$ and the resistor divider network (e.g., resistors $R_1$ and $R_2$). For example, integrated switch power controller 202 can control the power stage circuit (e.g., including transistor Q) to operate in a quasi-resonant mode according to detection voltage signal $V_S$, and the inductance current can be in a discontinuous current mode (DCM). In DCM operation, the current through the inductor (e.g., primary winding $N_P$ or secondary winding $N_S$) can fall to zero during a portion of the switching cycle.

In a quasi-resonant zero-current/zero-voltage switch (ZCS/ZVS), each switch cycle can deliver a quantized "packet" of energy to the converter output, and switch (e.g., transistor Q) turn-on and turn-off can occur at zero current and/or voltage, potentially resulting in a lossless switch. Quasi-resonant switching or "valley switching" can reduce electromagnetic interference (EMI) in the power supply. For example, by switching the transistor when the voltage across the transistor is at a minimum (e.g., in the valley or "bottom") can minimize hard switching effects that may cause EMI. Also, by switching when a valley is detected, rather than at a fixed frequency, a natural frequency jitter can spread out the radio frequency (RF) emissions spectrum, and may reduce overall EMI.

Figure 2B:
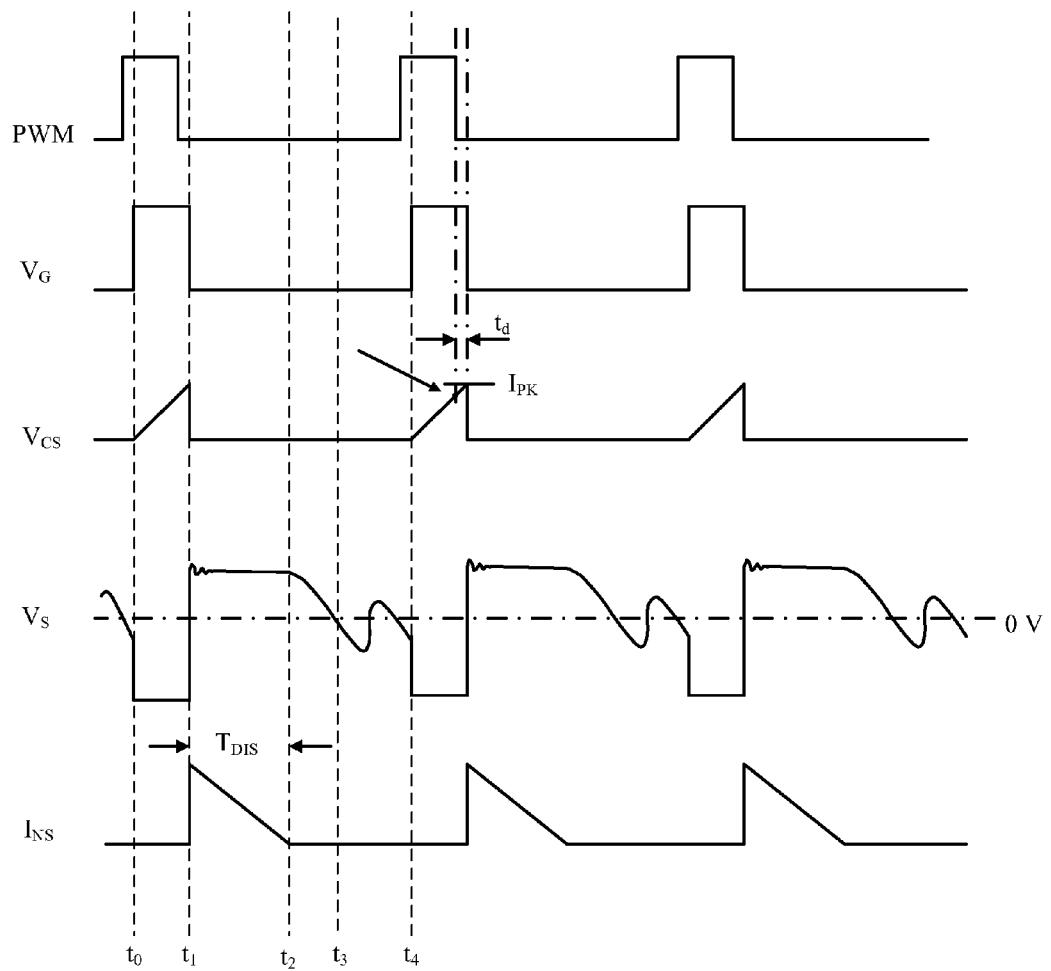
FIG. 2B is a waveform diagram showing example operation of the switch mode power supply of FIG. 2A, in accordance with embodiments of the present invention.

Referring now to FIG. 2B, shown is a waveform diagram of example operation of the switch mode power supply shown in FIG. 2A, in accordance with embodiments of the present invention. Each working period or switching cycle of switch mode power supply 200 can be divided into three time intervals based on the operating states of power switch device Q and transformer T. During the first time interval (e.g., from time $t_0$ to time $t_1$), when power transistor Q is turned on, the inductance current flowing through primary side winding $N_P$ can continuously rise, and primary side winding $N_P$ can continuously store energy. During this first time interval, a value (e.g., absolute value) of detection voltage signal $V_S$ can be determined as indicated below by formula (1).

$$|V_S| = V_{PWR} \times \frac{N_A}{N_P} \times \frac{R_2}{R_1 + R_2} \tag{1}$$

Since the number of turns of primary side winding $N_P$ and auxiliary winding $N_A$, as well as the values of resistors $R_1$ and resistor $R_2$ are constant values, detection voltage signal $V_S$ may be considered as proportional to input voltage $V_{PWR}$ of the switch mode power supply during this time interval.

Also during the first time interval, the inductance current flowing through primary side winding $N_P$ of transformer T can generate a current sample signal $V_{CS}$ on detection resistor $R_{CS}$ connected between power transistor Q and ground. Current sample signal $V_{CS}$ can be provided to integrated switch power controller 202 via pin CS. Due to inherent delays between the control and driving circuitry, current sample signal $V_{CS}$ may not accurately indicate the inductance current peak of primary side winding N. Thus in particular embodiments, integrated switch mode power supply controller 202 can compensate for current sample signal $V_{CS}$ based on detection voltage signal $V_S$. In this way, an accurate voltage signal (e.g., accurate in time and/or amplitude) that denotes the peak current information of the primary side winding $N_P$ can be obtained.

During the second time interval (e.g., from time $t_1$ to time $t_2$), when power switch device Q is turned off, the stored energy of primary side winding $N_P$ of transformer T can be transformed to secondary side winding $N_S$. The inductance current of secondary side winding $N_S$ can continuously decrease until reaching zero, and the stored energy of secondary side winding $N_S$ can be transferred to the load (e.g., at $V_{OUT}$). Primary side winding $N_P$ can thus be within a demagnetization time interval, and the value of the detection voltage signal $V_S$ can be approximated as below in formula (2).

$$|V_S| = \frac{N_A}{N_S} \times V_{OUT} \times \frac{R_2}{R_1 + R_2} \qquad (2)$$

Since the number of turns of secondary side winding $N_S$ and auxiliary winding $N_A$, as well as the values of resistors $R_1$ and $R_2$ are constant values, detection voltage signal $V_S$ may be proportional to output voltage $V_{OUT}$ at the output of the power stage circuit.

Therefore, whether output voltage $V_{OUT}$ is in an overvoltage state (e.g., when output voltage $V_{OUT}$ is raised above its upper design or a predetermined limit) can be determined according to detection voltage signal $V_S$ and a reference voltage (to provide the predetermined limit). Thus, when output voltage $V_{OUT}$ is in an overvoltage state, power transistor Q can be turned off. In addition, during the second time interval, the length or duration of the discharge time of the inductance current of secondary side winding $N_S$ can also be obtained based on detection voltage signal $V_S$.

During the third time interval (e.g., from time $t_2$ to time $t_4$), after the inductance current of secondary side winding $N_S$ is reduced to zero, power transistor Q is off, and resonance can occur at the inductance of primary side winding $N_P$, power transistor Q, and parasitic capacitance. For example, if power transistor Q is a MOSFET transistor, detection voltage signal $V_S$ can denote drain-source voltage $V_{DS}$ of power transistor Q. During the resonance time, the value of detection voltage signal $V_S$ can be determined as indicated in formula (3) below.

$$|V_S| = \frac{N_A}{N_S} \times (V_{OUT} + V_{DS}) \frac{R_2}{R_1 + R_2} \qquad (3)$$

Since the number of turns of auxiliary winding $N_A$ and secondary side winding $N_S$, and the values of resistors $R_1$ and $R_2$ are constant values, output voltage $V_{OUT}$ can be maintained as substantially constant. Also, the amplitude of detection voltage signal $V_S$ can be proportional to, or approximated as, drain-source voltage $V_{DS}$ of power transistor Q. By using a "bottom moment" or minimum (e.g., a local minimum or valley) of drain-source voltage $V_{DS}$ as determined by detection voltage signal $V_S$, power transistor Q can be turned on at this local minimum time. In this way, quasi-resonant switching can be realized, and may reduce turn-on power consumption of power transistor Q and enhance overall system efficiency (e.g., by reducing EMI).

In particular embodiments, the integrated switch power controller can receive a detection voltage signal (e.g., $V_S$) of the auxiliary winding via a multiplexing pin (e.g., FB). Quasi-resonant switching or control, peak current compensation, and overvoltage protection, can be realized, as described above. In addition, the power switch device/transistor can be turned on based on a local minimum voltage or valley/bottom voltage across its drain and source ($V_{DS}$). This approach can reduce power consumption, protect the system, and enhance system reliability. The use of the multiplexing pin can also reduce the number of chip pins, and the size of the chip, and production costs.

Figure 3:
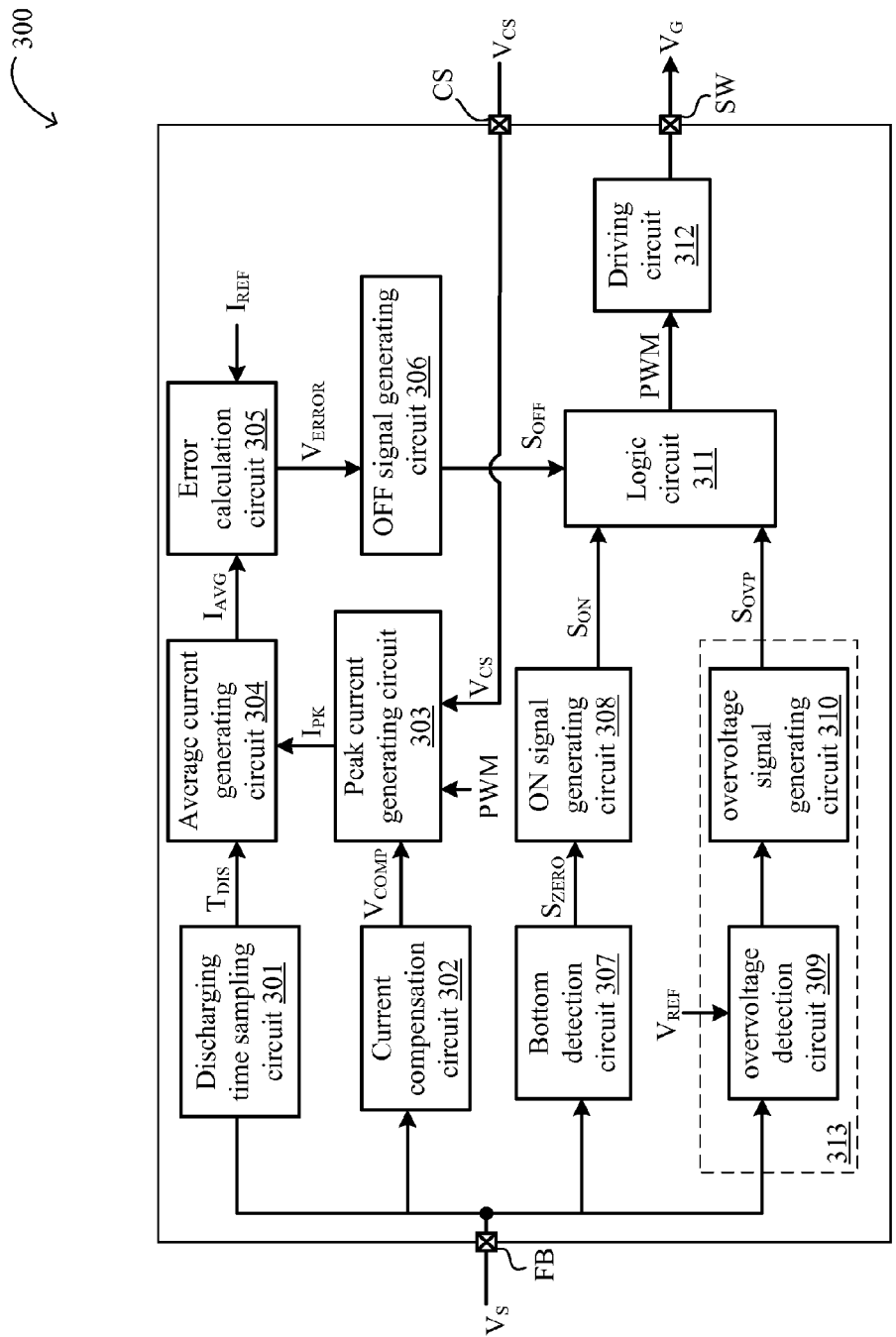
FIG. 3 is a schematic block diagram of an example integrated switch mode power supply controller in accordance with embodiments of the present invention.

Referring now to FIG. 3, shown is a schematic block diagram of an example integrated switch power controller, in accordance with embodiments of the present invention. Example integrated switch power controller 300 can include multiplexing pin FB, output pin SW, and current sample pin CS. Current sample pin CS can receive current sample signal $V_{CS}$ that may be obtained via sample resistor $R_{CS}$, as shown in FIG. 2A.

Multiplexing pin FB can receive detection voltage signal $V_S$ that may be obtained by auxiliary winding $N_A$. Integrated switch power controller 300 can perform a corresponding process on detection voltage signal $V_S$, and power transistor Q in the power stage circuit can be driven by driving signal $V_G$ via output pin SW. In this way, the output electrical signal of the power-stage circuit can be maintained as substantially constant. For example, the control mode of integrated switch mode power supply controller 300 may be a peak current control mode, while the driving mode of the power stage circuit can be a quasi-resonant driving mode.

Detection voltage signal $V_S$ received by multiplexing pin FB can pass through at least four "paths" as part of the process performed by integrated switch power controller 300 on detection voltage signal $V_S$. In a first path (discharge time sampling), referring back to FIG. 2B, within the second time interval (e.g., time $t_1$ to time $t_2$), inductance current $I_{NS}$ of secondary winding $N_S$ of transformer T may gradually reduce to zero. Since output current $I_{GUT}$ of switch mode power supply 200 is the average value of inductance current $I_{NS}$, the peak value of inductance current $I_{NS}$ can be inferred according to the current sample signal $V_{CS}$. Thus if the discharge time length $T_{DIS}$ (time $t_1$ to time $t_2$), or the discharge duration, can be obtained, then the value of output current $I_{GUT}$ can be accordingly calculated.

In one example, the falling time point (e.g., the time at which the signal begins to decrease) of voltage signal $V_S$ can be determined during each switch period (e.g., time $t_2$), and the discharge duration (e.g., $R_{DIS}$) of each switch cycle can be inferred therefrom. Various implementations of discharge time sample circuit 301 (see, e.g., Chinese patent application CN201210233135.3) can be supported in particular embodiments.

In a second path (peak current compensation) of processing detection voltage signal $V_S$, peak current information of primary winding $N_P$ can be obtained via current sample pin CS, and can be compensated by detection voltage signal $V_S$. In this way, errors generated due to inherent delays of the system can be compensated for to obtain correct or accurate peak current information. Current compensation circuit 302 can receive detection voltage signal $V_S$ to generate corresponding current compensation signal $V_{COMP}$ to output to peak current generating circuit 303. Peak current generating circuit 303 can receive a pulse-width modulation (PWM) control signal, and may superimpose current compensation signal $V_{COMP}$ and current sample signal $V_{CS}$ received via current sample pin CS. Peak sampling can be performed on the superimposed calculation result in order to obtain peak current $I_{PK}$.

Average current generating circuit 304 can calculate a current average value $I_{AVG}$ according to discharge time length or duration $T_{DIS}$ and peak current $I_{PK}$. Here, current average value $I_{AVG}$ may denote output current information of the switch mode power supply. Error calculation circuit 305 can receive current average value $I_{AVG}$ and current reference $I_{REF}$ denoting a desired output current level, and may calculate an error therebetween to obtain error signal $V_{ERROR}$. Turning-off (OFF) signal generating circuit 306 can generate turn-off control signal $S_{OFF}$ according to error signal $V_{ERROR}$. Any suitable implementation of current compensation circuit 302 (see, e.g., Chinese patent application CN201210216958.5), average current generating circuit 304, error calculation circuit 305, and OFF signal generating circuit 306 (see, e.g., Chinese patent application CN201210233135.3) can be supported in particular embodiments.

In a third path (bottom turning-on power device) of processing detection voltage signal $V_S$, bottom/valley or minimum voltage level detection circuit 307 can receive detection voltage signal $V_S$, and detect a zero time of detection voltage signal $V_S$ (e.g., as time $t_3$ in FIG. 2B). After a certain or predetermined time delay, power switch device Q can again be turned on at time $t_4$ (e.g., by $V_G$ going high). Bottom detection circuit 307 can also include a comparator that receives detection voltage signal $V_S$ and the zero indication, and may generate zero signal $S_{ZERO}$. ON signal generating circuit 308 can generate ON signal $S_{ON}$ after a certain or predetermined time delay according to zero signal $S_{ZERO}$. For example, ON signal generating circuit 308 can include a single-pulse or one-shot generating circuit.

In a fourth path (output voltage overvoltage protection) of processing detection voltage signal $V_S$, within each switch period (e.g., from time $t_1$ to time $t_2$ of FIG. 2B) detection voltage signal $V_S$ can be approximately proportional to output voltage $V_{OUT}$. Thus, overvoltage detection circuit 309 in overvoltage protection circuit 313 can compare detection voltage signal $V_S$ against reference voltage $V_{REF}$ to determine the overvoltage condition. For example, overvoltage detection circuit 309 can include a comparator, and an overvoltage signal $S_{OVP}$ can be generated after the comparison result passes through overvoltage signal generating circuit 310. For example, overvoltage signal generating circuit 310 can include a single-pulse generating circuit.

Logic circuit 311 can receive OFF signal $S_{OFF}$, ON signal $S_{ON}$ and overvoltage signal $S_{OVP}$, and may generate control signal PWM. When output voltage $V_{OUT}$ is not in an overvoltage condition, ON signal $S_{ON}$ can control power switch device Q to turn on at time $t_0$. OFF signal $S_{OFF}$ can control power switch device Q to be turned off at time $t_1$. When output voltage $V_{OUT}$ is in an overvoltage condition, overvoltage signal $S_{OVP}$ can control logic circuit 311 to disable the switch pulse of control signal PWM. Otherwise, integrated switch power controller 300 might enter into a locked state until the switch mode power supply is turned on again.

When the load is a light-emitting diode (LED), the power supply system can be protected by using overvoltage protection circuit 313 during abnormal conditions, such as when the LED is short-circuited or open-circuited. Driving circuit 312 can receive control signal PWM, and may generate a corresponding driving signal $V_G$ to control the switching actions of power switch device Q via output pin SW.

Various example implementations of an integrated switch power controller in particular embodiments, and a switch mode power supply using the same, have been described herein. Those skilled in the art will recognize that the present invention is not limited to the above disclosed embodiments, and other suitable circuit structures based on the principles of the present invention are also suitable for embodiments of the present invention. For example, the topology of the switch mode power supply is not limited to flyback topology, and any suitable topology, such as other isolated or non-isolated topologies, or also applicable to the present invention.

The embodiments were chosen and described in order to best explain the principles of the invention and its practical applications, to thereby enable others skilled in the art to best utilize the invention and various embodiments with modifications as are suited to the particular use contemplated. It is intended that the scope of the invention be defined by the claims appended hereto and their equivalents.

What is claimed is:

1. An integrated switch mode power supply controller, comprising:
    a) a multiplexing pin configured to receive a detection voltage signal, and a current sample pin configured to receive a current sample signal;
    b) a switch mode power supply configured to receive a DC input voltage, and to operate in a switching cycle having first, second, and third time intervals, wherein said switch mode power supply comprises a transformer having primary and secondary windings;
    c) wherein during said first time interval, said detection voltage signal is proportional to said DC input voltage, a current compensation signal is configured to be generated according to said detection voltage signal, and said current compensation signal is configured to be superimposed with said current sample signal to obtain a peak current flowing through said primary winding;
    d) wherein during said second time interval, said detection voltage signal is proportional to an output voltage of said switch mode power supply, and a discharging duration of current through said secondary winding is determined based on said detection voltage signal; and
    e) wherein during said third time interval, said detection voltage signal is proportional to a voltage across a power transistor of said switch mode power supply, said power transistor being turned on at a local minimum according to said detection voltage signal.

2. The integrated switch mode power supply controller of claim 1, further comprising a discharge time sample circuit configured to obtain said discharge duration according to said detection voltage signal.

3. The integrated switch mode power supply controller of claim 2, further comprising a current compensation circuit configured to generate said current compensation signal.

4. The integrated switch mode power supply controller of claim 3, further comprising a peak current generating circuit configured to receive a current sample signal and said current compensation signal, and to generate said peak current.

5. The integrated switch mode power supply controller of claim 4, further comprising a turning-off signal generating circuit configured to generate a turning-off signal according to said peak current and said discharge duration.

6. The integrated switch mode power supply controller of claim 1, further comprising an overvoltage protection circuit configured to activate an overvoltage signal as a single pulse in response to said detection voltage signal being greater than a reference voltage, wherein said power transistor is disabled for said switching cycle when said overvoltage signal is activated.

7. The integrated switch mode power supply controller of claim 6, wherein said overvoltage protection circuit comprises a comparator coupled to a single-pulse generating circuit that is configured to generate said overvoltage signal.

8. The integrated switch mode power supply controller of claim 1, further comprising a bottom detection circuit configured to receive said detection voltage signal, and to generate a turning-on signal to turn on said power transistor when a voltage across said power transistor reaches said local minimum.

9. The integrated switch mode power supply controller of claim 1, further comprising a power stage circuit, wherein said integrated switch mode power supply controller is configured to control a switch state of said power transistor to maintain an output of said power stage circuit as substantially constant.

10. The integrated switch mode power supply controller of claim 9, wherein said power stage circuit comprises an isolated topology.

11. The integrated switch mode power supply controller of claim 1, wherein said current compensation signal is superimposed with said current sample signal using a pulse-width modulation (PWM) control signal.

* * * * *